(12) United States Patent
Bente et al.

(10) Patent No.: US 12,359,686 B2
(45) Date of Patent: Jul. 15, 2025

(54) TOLERANCE COMPENSATION DEVICE

(71) Applicant: WITTE Automotive GmbH, Velbert (DE)

(72) Inventors: Jan Bente, Sprockhövel (DE); Vladimir Radanovic, Cologne (DE)

(73) Assignee: WITTE AUTOMOTIVE GMBH, Velbert (DE)

( * ) Notice: Subject to any disclaimer, the term of this patent is extended or adjusted under 35 U.S.C. 154(b) by 588 days.

(21) Appl. No.: 17/749,725

(22) Filed: May 20, 2022

(65) Prior Publication Data
US 2022/0373010 A1    Nov. 24, 2022

(30) Foreign Application Priority Data

May 21, 2021   (DE) .......................... 102021113281.9

(51) Int. Cl.
*F16B 5/02*      (2006.01)
*F16B 43/00*     (2006.01)

(52) U.S. Cl.
CPC ............ *F16B 5/0283* (2013.01); *F16B 43/00* (2013.01)

(58) Field of Classification Search
CPC .......... F16B 43/00; F16B 19/04; F16B 37/08; F16B 5/02; F16B 5/0283; F16B 5/025
See application file for complete search history.

(56) References Cited

U.S. PATENT DOCUMENTS

2008/0038090 A1 *  2/2008  Figge ..................... F16B 5/025
                                                                      403/4

FOREIGN PATENT DOCUMENTS

| DE | 202007008154 U1 | 9/2007 |
| DE | 102011055363 A1 | 5/2012 |
| DE | 102007037242 B4 | 5/2019 |

OTHER PUBLICATIONS

German Patent Office Search Report dated Mar. 7, 2022; counterpart German Patent Application No. 10 2021 113 281.9.

* cited by examiner

*Primary Examiner* — Daniel J Wiley
(74) *Attorney, Agent, or Firm* — Wiggin and Dana LLP (57) ABSTRACT

The present disclosure relates to a tolerance compensation device for bridging a distance between two components to be connected to one another, comprising a base element and a compensating element which can be screwed into the base element, the base element forming at least one stop and the compensating element having at least one elastically deformable transport securing means which is designed in such a way that it must overcome the stop with temporary deformation in order to screw the compensating element into the base element.

13 Claims, 5 Drawing Sheets

TOLERANCE COMPENSATION DEVICE

CROSS-REFERENCE TO RELATED APPLICATION

This application claims the benefit of priority under 35 U.S.C. § 119(a) to German Patent Application No. 102021113281.9, filed May 21, 2021, which is herein incorporated by reference in its entirety.

The present disclosure relates to a tolerance compensation device for bridging a distance between two components to be connected to one another, comprising a base element and a compensating element which can be screwed into the base element.

Such a tolerance compensation device is known in principle. The base element and the compensating element are usually two loose individual parts, with the compensating element being screwed into the base element during transport of the tolerance compensation device to its intended assembly site. In order to prevent the compensating element from accidentally becoming detached from the base element during transport, in a known tolerance compensation device a plastic ring is attached to the base element, which forms securing during transport for the compensating element. The same plastic ring or another plastic ring attached to the base element can, as an interface to a customer's component, form fastening means for fastening the tolerance compensation device to one of the components to be connected, for example in the form of snap-in clips.

In practice, it is becoming increasingly common for the base element itself to form the customer interface and for this purpose, the base element is already permanently installed on the component of a system or module supplier, for example.

The object of the present disclosure is to create a tolerance compensation device that allows a system or module supplier to easily transport the component, including the base element and the compensating element screwed into the base element, to its customer, for example a vehicle manufacturer, without the compensating element being able to become detached from the component.

The object is achieved by a tolerance compensation device having the features of claim 1 and in particular in that the base element forms at least one stop and the compensating element has at least one elastically deformable transport securing means which is designed in such a way that it must overcome the stop with temporary deformation in order to screw the compensating element into the base element. Conversely, the transport securing means must also overcome the stop when unscrewing the compensating element from the base element, whereby the compensating element screwed into the base element is secured against unintentional unscrewing from the base element, for example during transport.

A general idea of the present disclosure is therefore to shift the functionality of the securing during transport to the compensating element. In this way, the base element can be made much simpler and can be integrated, for example by a system or module supplier, into the component of its system or module with correspondingly little effort. In particular, the base element as a customer interface can easily be adapted to desired customer specifications, while the functionality of the tolerance compensation, securing during transport and, if necessary, limiting of the screwing-in is provided by the manufacturer of the compensating element.

Advantageous embodiments of the present disclosure can be found in the dependent claims, the description and the drawings.

According to one embodiment, the compensating element has at least one end stop which can be engaged with the/a stop of the base element in order to limit the screwing movement of the compensating element into the base element. The end stop of the compensating element prevents the compensating element from being screwed into the base element and then no longer being able to be screwed out of the base element. The end stop thus contributes to ensuring a permanently reliable function of the tolerance compensation device.

According to a further embodiment, the compensating element forms a radially projecting collar. For example, a side of the collar facing away from the base element can define a contact surface for contact with the other component. In this case, the collar ensures improved force absorption when the tolerance compensation device arranged between the components connected to one another is supported on the other component, and thus ultimately contributes to a more reliable connection of the components. Alternatively or additionally, the collar can contribute to limiting the screwing movement of the compensating element into the base element.

Furthermore, the at least one elastically deformable transport securing means can be formed by a spring tongue which projects axially at least in part from the collar of the compensating element in the direction of the base element. In this context, the axial direction is defined by the longitudinal central axis of the thread of the compensating element, with which the compensating element is screwed into the base element.

According to a structurally particularly simple embodiment, a plastic ring is attached to the collar in a rotationally fixed manner. For example, the plastic ring can be pressed, shrunk or glued onto the collar.

The plastic ring advantageously forms the at least one elastically deformable transport securing means and optionally at least one end stop of the compensating element.

In order to facilitate handling of the compensating element, in particular screwing the compensating element into the base element, the plastic ring advantageously has a lateral surface with a structure that increases the grip, for example with knurling or with a plurality of planar surfaces.

According to a further embodiment, the at least one elastically deformable transport securing means is formed by a spring tongue which extends in the circumferential direction and which forms a radially outwardly directed projection which protrudes radially outwards via an external thread of the compensating element. When the compensating element is screwed into the base element, the spring tongue can be pressed radially inwards against its spring force in order to avoid an internal thread of the base element. In order to make it easier for the compensating element to enter the base element, the projection can form an inclined surface on which the internal thread of the base element runs, in order to displace the spring tongue radially inwards.

According to yet another embodiment, the at least one stop of the base element is formed by a radially projecting rib, by a web or wall portion which delimits a pocket or groove formed in a surface of the base element facing the compensating element, by an end face of the base element and/or by a radially inwardly directed projection of the base element.

In principle, one and the same stop of the base element can interact with the transport securing means and the end stop of the compensating element and thus fulfill a dual function in that it contributes both to securing during transport and to limiting the screwing-in of the compensating element. Alternatively, the base element can form a first stop for interaction with the transport securing means and a second stop for interaction with an end stop of the compensating element.

According to yet another embodiment, the base element is an integral part of the one component. The base element can be formed by the component itself or connected thereto in a material-bonding and/or force-fitting manner, for example welded, soldered, injection molded or glued to the component or pressed onto the component or pressed into the component.

A further object of the present disclosure is a compensating element for a tolerance compensation device, in particular of the type described above, comprising at least one elastically deformable transport securing means, which is designed in such a way that it must overcome a stop of the base element with temporary deformation in order to screw the compensating element into a corresponding base element. Such a compensating element, in particular in connection with a corresponding base element, allows the advantages described above to be correspondingly realized.

Figure 1A:
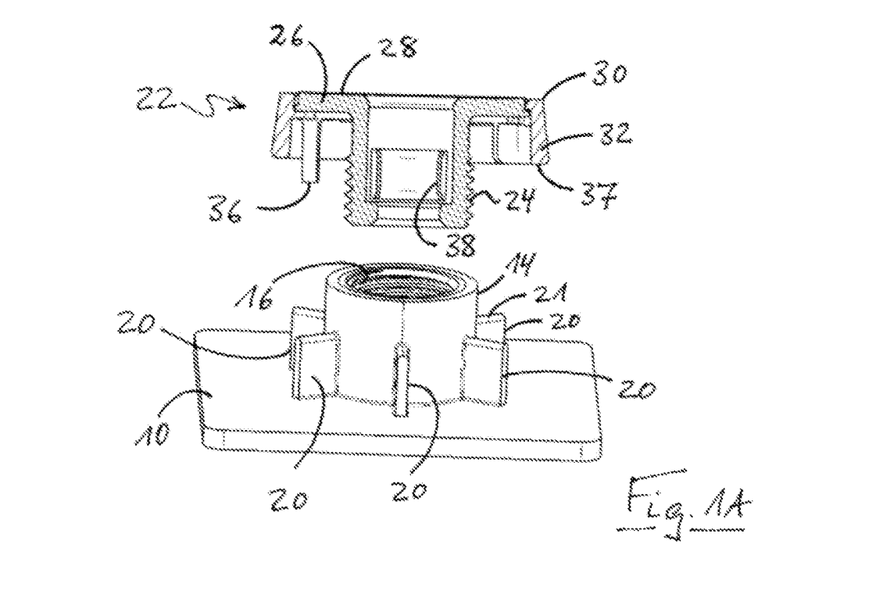
FIG. 1A shows a first embodiment of a tolerance compensation device according to the present disclosure with a separate base element and compensating element, the compensating element being shown in a sectional view.
Figure 1B:
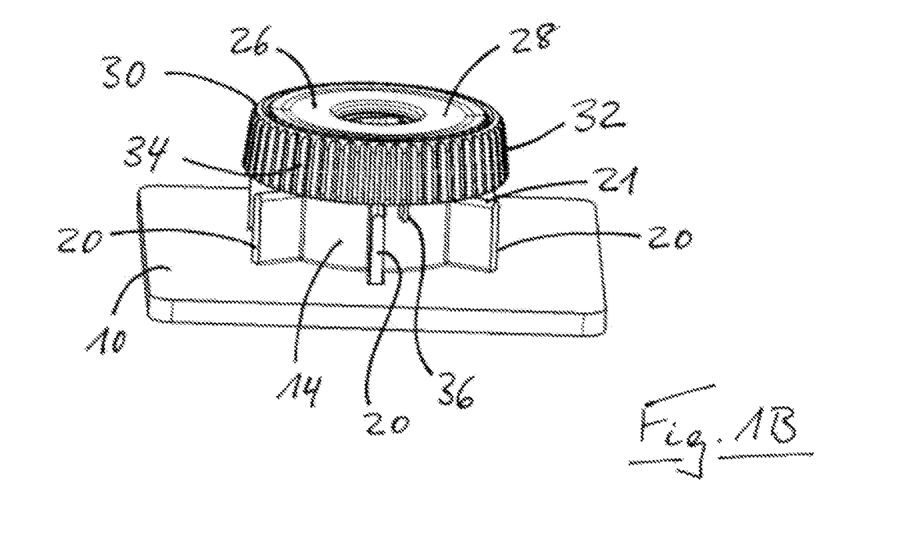
FIG. 1B shows the tolerance compensation device of FIG. 1A with the compensating element screwed into the base element.

The present disclosure is described below purely by way of example using possible embodiments with reference to the accompanying drawings. In the drawings:

FIGS. 1A and 1B show a first embodiment of a tolerance compensation device, which serves to bridge a distance between two components to be connected to one another by means of a connecting element (not shown), e.g. a screw or a threaded bolt, a first component 10 of which is shown in FIG. 1A.

The tolerance compensation device comprises a base element 14, which is integrated into the first component 10, in particular formed by the first component 10 itself or is firmly connected, in particular in a material-bonding manner, to the first component. For example, the base element 14 can be welded or glued to the first component 10. The base element 14 has a hollow-cylindrical basic shape and forms an internal thread 16 whose longitudinal central axis defines an axial direction.

A plurality of radially outwardly projecting ribs 20 emerge from a lateral surface 18 of the base element 14, the respective undersides of which are in contact with the first component 10 and can in particular be connected thereto in a material-bonding manner. The upper sides 21 of the ribs 20 facing away from the first component 10 extend in a plane perpendicular to the longitudinal central axis of the internal thread 16.

In the present embodiment, the base element 14 is provided with six ribs 20 which, viewed in the circumferential direction, are evenly distributed, i.e. are arranged around the base element 14 at an angular distance of 60° from one another. In principle, however, another even or odd number of ribs 20 greater than two is also conceivable.

The tolerance compensation device also comprises a compensating element 22, which in turn has a hollow-cylindrical basic shape and, in a lower region, forms an external thread 24 adapted to the internal thread 16 of the base element 14, so that the compensating element 22 can be screwed into or out of the base element 14. In the region of its upper side facing away from the first component 10, the compensating element 22 forms a radially projecting circumferential collar 26, the upper side of which defines a contact surface 28 with which the tolerance compensation device comes into contact with the second component to be connected to the first component 10.

A plastic ring 30 is attached to the collar 26 in a rotationally fixed manner, for example pressed thereon, which ring forms a circumferential outer wall 32 extending from the stop surface 28 in the direction of the first component 10, the outside of which is knurled 34 to improve the grip. The plastic ring 30 also forms an elastic transport securing tongue 36, which extends inside the outer wall 32 substantially parallel to the longitudinal central axis of the external thread 24, i.e. axially, in the direction of the first component 10 and protrudes downwards over the lower edge 37 of the outer wall 32 facing the first component 10.

In addition to the transport securing tongue 36 which can be seen in FIGS. 1A and 1B, at least one further transport securing tongue 36 can also be provided on the plastic ring 30, which is designed like the transport securing tongue 36 shown. In the case of a plurality of transport securing tongues 36, these can be arranged on the plastic ring 30 in a substantially evenly distributed manner, viewed in the circumferential direction.

The axial dimension of the outer wall 32, in a sense the height of the outer wall 32, is adapted to the height of the ribs 20 in such a way that the lower edge 37 of the outer wall 32 rests on the upper sides 21 of the ribs 20 when the compensating element 22 is screwed into the base element 14 to the maximum, as shown in FIG. 1B. In other words, the lower edge 37 of the outer wall 32 forms an end stop, which defines an end position of the compensating element 22, i.e. limits the screwing movement of the compensating element 22 into the base element 14 and prevents the compensating element 22 from being screwed into the base element 14 as a block and then no longer being able to be easily detached therefrom.

The state shown in FIG. 1B represents a pre-assembly or transport state, in which the first component 10 together with the tolerance compensation device can be transported to an intended assembly site. In order to prevent the compensating element 22 from unintentionally screwing out of the base element 14 during transport, for example due to vibrations, the transport securing tongue 36 of the plastic ring 30 attached to the compensating element 22 protrudes so far beyond the lower edge of the outer wall 32 of the plastic ring 30 that the transport securing tongue 36 engages behind one of the ribs 20 and thereby limits the unscrewing movement of the compensating element 22. It should be understood that the axial length of the transport securing tongue 36, i.e. the maximum overlap between the transport securing tongue 36 and rib 20, as well as the distance between two adjacent ribs 20 and the pitch of the internal thread 16 and the external thread 24 must be adapted to one another in such a way that the transport securing tongue 36 still abuts against a rib 20 when the compensating element 22 is screwed, starting from its end position, by the angular distance between two adjacent ribs 20 relative to the base element 14.

To connect the first component 10 provided with the tolerance compensation device to the designated second component, a connecting element (not shown in the drawings), for example a screw or a threaded bolt, is inserted, for example from the second component, i.e. from above in the drawings, through the tolerance compensation device and corresponding bores in the components and screwed into a complementary nut element, which, for example, can be fixed to the first component 10 or integrated into the base element 14.

The screwing movement of the connecting element into the nut element ensures that the compensating element 22 is screwed out of the base element 14 until it engages with its contact surface 28 on the second component. It should be understood that the orientation of the internal thread 16 and external thread 24 of the tolerance compensation device on the one hand and the orientation of the thread of the connecting element and nut element must be adjusted accordingly. If the connecting element and the nut element each form a right-hand thread, for example, and the connecting element is passed through the tolerance compensation device from the side of the second component, i.e. from above in the drawings, and screwed into the nut element, the internal thread 16 and the external thread 24 must be left-hand threads.

In order to improve the transmission of torque from the connecting element to the compensating element 22, a spring clip 38 is arranged in the compensating element 22, which is in engagement both with the connecting element extending through the tolerance compensation device and with the compensating element 22. It should be understood that the transport securing tongue 36 is designed to be elastic in such a way that the torque that can be exerted on the compensating element 22 by the connecting element is sufficient to deform the transport securing tongue 36 to such an extent that it overcomes the rib 20 limiting the unscrewing movement and the compensating element 22 can be unscrewed from its transport state shown in FIG. 1B.

A second embodiment of a tolerance compensation device with a base element 14 and a compensating element 22 is shown in FIG. 2A to 2F.

The base element 14 of this embodiment is based on a pot-shaped base body 40 with a base 41, which forms a threaded hole 42, which serves as a nut element for a connecting element (not shown). In a hollow-cylindrical portion located above the base 41 in FIG. 2B, the base element 14 forms an internal thread 16, into which the compensating element 22, which is provided with a corresponding external thread 24, can be screwed.

Figure 2A:
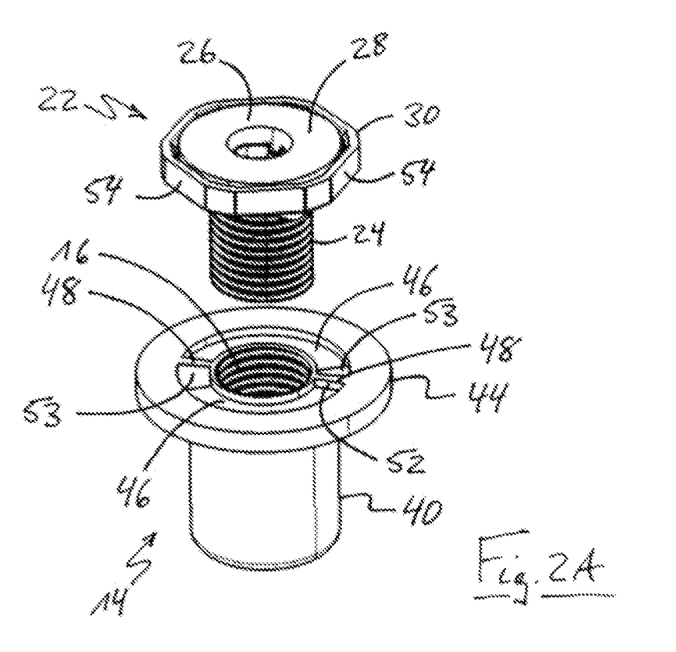
FIG. 2A shows a second embodiment of a tolerance compensation device according to the present disclosure with a separate base element and compensating element.
Figure 2B:
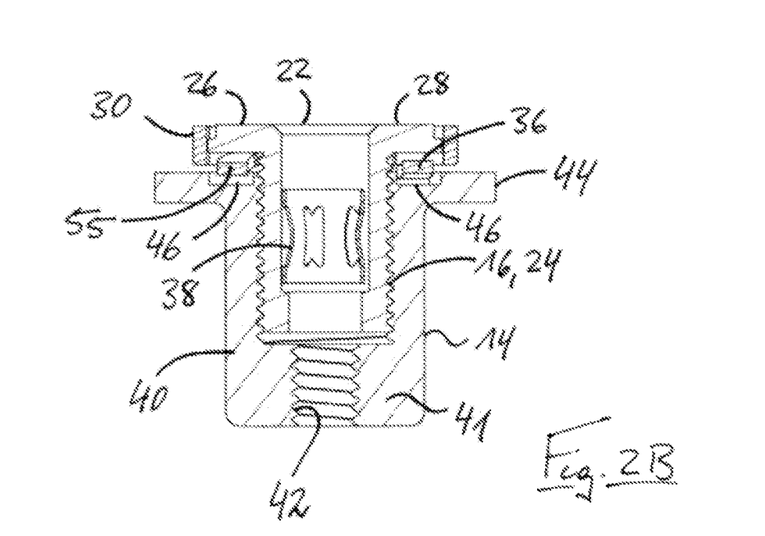
FIG. 2B is a sectional view of the tolerance compensation device of FIG. 2A with the compensating element screwed into the base element.
Figure 2C:
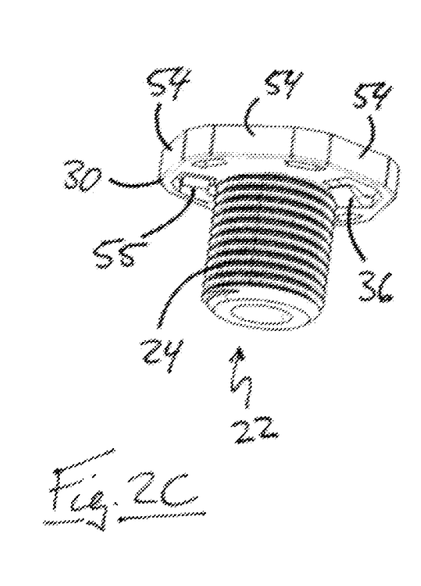
FIG. 2C is a perspective view of the compensating element of FIG. 2A.
Figure 2D:
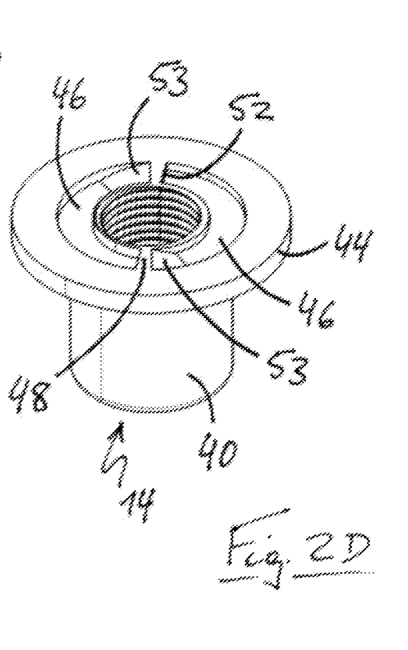
FIG. 2D is a perspective view of the base element of FIG. 2A.
Figures 2E, 2F:
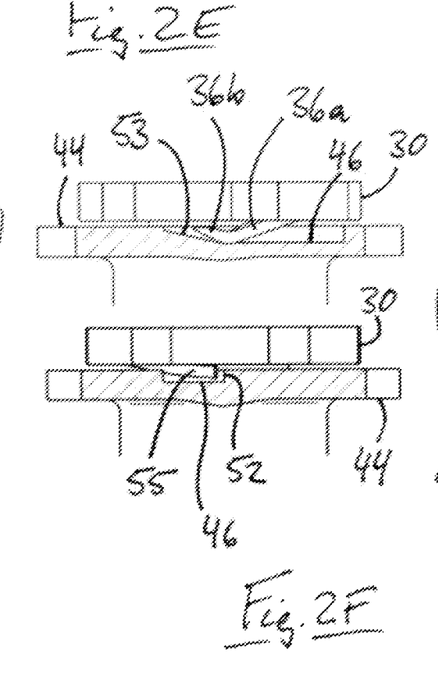
FIG. 2E is a first detailed view of the compensating element screwed into the base element.
FIG. 2F is a second detailed view of the compensating element screwed into the base element.

In the region of its upper end facing away from the base 41, the base element 14 also forms a radially projecting circumferential flange portion 44. Two partially annular grooves 46 extending in the direction of rotation of the compensating element 22 are formed in the upper side of the flange portion 44 facing away from the base 41, which are separated from one another by two webs 48 extending radially with respect to the longitudinal central axis of the internal thread 16 of the base element 14 and lie in a plane running parallel to the longitudinal central axis. In other words, the webs 48 are spaced apart from one another by an angle of 180° and define the ends of the grooves 46. Specifically, each groove 46 has a first end, viewed in the screwing-in direction of the compensating element 22, which adjoins one web 48 and, viewed in the unscrewing direction of the compensating element 22, has a second end which adjoins the other web 48. The respective first end is defined by a wall portion 52 of the adjoining web 48 oriented parallel to the longitudinal central axis, while in the region of the respective second end the base of the groove 46 merges into a ramp 53 that extends to the upper side of the adjoining web 48.

Similar to the compensating element 22 of the first embodiment, the compensating element 22 of the second embodiment is based on a hollow-cylindrical basic shape and has an external thread 24 complementary to the internal thread 16 of the base element 14. Correspondingly, a spring clip 38 is also arranged inside the compensating element 22 here in order to optimize the transmission of torque from a connecting element inserted through the tolerance compensation device to the compensating element 22. Like the compensating element 22 of the first embodiment, the compensating element 22 of the second embodiment also forms a radially projecting circumferential collar 26 in the region of its end face facing away from the base element 14, to which a plastic ring 30 is attached in a rotationally fixed manner, for example by pressing or gluing.

In contrast to the first embodiment, according to the second embodiment, an outer wall 32 of the plastic ring 30 is not provided with knurling, rather the outer wall 32 forms six planar surfaces 54 running at an angle to one another, which give the plastic ring 30 the shape of a hexagon and, in addition to improving the grip, also allow a tool to be used to screw the compensating element 22.

In a further difference from the first embodiment, the plastic ring 30 of the second embodiment does not have a transport securing tongue 36 which extends exclusively axially, i.e. in the direction of the longitudinal central axis. Instead, the plastic ring 30 forms a transport securing tongue 36 that extends in the direction of rotation of the compensating element 22 and has an elastic first tongue portion 36a and a second tongue portion 36b angled thereto, with the first tongue portion 36a emerging obliquely downwards from the underside of the plastic ring 30 facing the base element 14, i.e. extending both in the direction of rotation and in the direction of the base element 14, and the adjoining angled second tongue portion 36b extending obliquely upwards, i.e. with an extension component in the direction of rotation and an extension component in the direction of the plastic ring 30.

The inclination and length of the first tongue portion 36a, which extends obliquely downwards, is selected such that the transport securing tongue 36 dips into one of the grooves 46 when the compensating element 22 is screwed into the base element 14 until it assumes its screwed-in transport state. If the compensating element 22 moves in the unscrewing direction in the transport state, the transport securing tongue 36 engages with the ramp 53 at the second end of the groove 46, as a result of which the unscrewing movement of the compensating element 22 is limited. Specifically, the second tongue portion 36*b*, which is angled obliquely upwards, here runs onto the ramp 53. If a torque exerted on the compensating element 22 is sufficiently high, as is the case, for example, when a connecting element extending through the tolerance compensation device is screwed into the threaded bore 42, the transport securing tongue 36 running onto the ramp 53 is deflected upwards far enough that the transport securing tongue 36 can overcome the web 48 adjacent to the ramp 53 and the compensating element 22 can then be freely unscrewed from the base element 14.

In addition to the transport securing tongue 36, the plastic ring 30 forms a stop tongue 55, which extends obliquely downwards in the screwing-in direction from the underside of the plastic ring 30 in the direction of the base element 14. As seen in the direction of rotation, the stop tongue 55 is arranged at approximately 180° to the transport securing tongue 36 and protrudes axially downwards far enough that it dips into the other groove 46 of the base element 14 when the compensating element 14 is screwed into the base element 14 and assumes its transport state. The screwing-in movement of the compensating element 14 is limited by the stop tongue 55 abutting the wall portion 52 of the web 48 delimiting the first end of the other groove 46, i.e. the stop tongue 55 assumes the function of an end stop in this case.

Figure 3A:
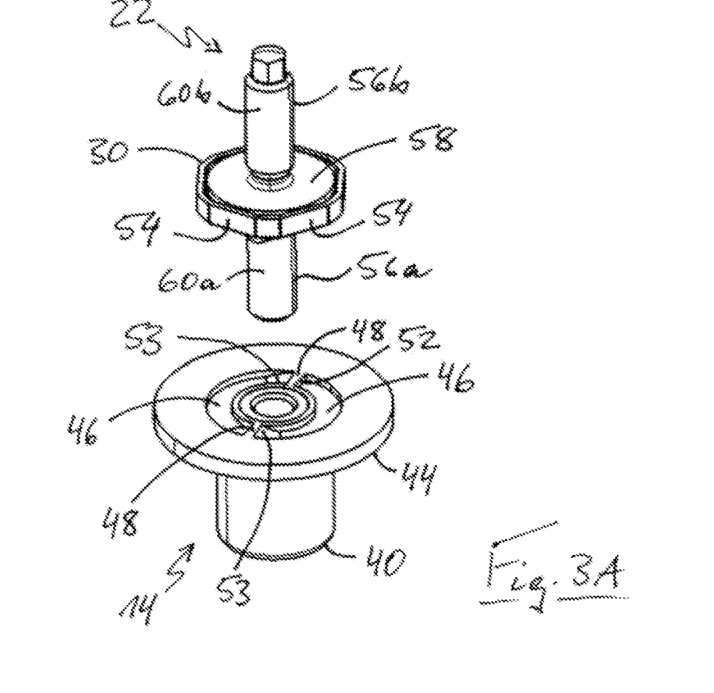
FIG. 3A shows a third embodiment of a tolerance compensation device according to the present disclosure with a separate base element and compensating element.
Figure 3B:
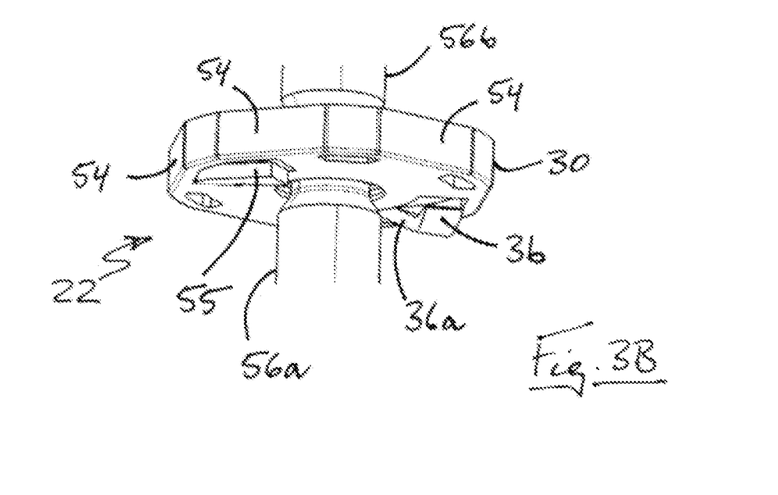
FIG. 3B is a detailed view of the compensating element of FIG. 3A.

FIGS. 3A and 3B show a third embodiment of a tolerance compensation device, the base element 14 of which is designed similarly to the base element 14 of the second embodiment and in particular has a flange portion 44 with two grooves 46 and two webs 48 of the type described above. In contrast to the second embodiment, however, the base element 14 of the third embodiment does not form a threaded bore 42 serving as a nut element for the connecting element, but only an internal thread 16.

In a further difference from the second embodiment, the compensating element 22 of the third embodiment is not designed as a hollow cylinder, but in the form of a threaded bolt which has a first threaded portion 56*a* and a second threaded portion 56*b* separated therefrom by a central collar 58. The first threaded portion 56*a* forms a first external thread 60*a* that is complementary to the internal thread 16 of the base element 14, so that the first threaded portion 56*a* of the compensating element 22 can be screwed into the internal thread 16 of the base element 14. The second threaded portion 56*b* forms a second external thread 60*b* and is provided for receiving a nut element (not shown). The orientations of the external threads 60*a*, 60*b* can in principle be the same or different. In the embodiment shown, the first external thread 60*a* is a left-hand thread and the second external thread 60*b* is a right-hand thread. This ensures that if the compensating element 22 is inadvertently screwed when the nut element is screwed onto the second threaded portion 56*b*, the compensating element 22 will in any case not be screwed into the base element 14, but rather out of it.

Attached to the central collar 58 is a plastic ring 30 of the type described in connection with the second embodiment. As a result of the interaction of the transport securing tongue 36 and the stop tongue 55 of the plastic ring 30 with the grooves 46 and webs 48 formed in the flange portion 44 of the base element 14, the compensating element 22 formed as a threaded bolt can consequently also be secured against jamming and unintentional unscrewing when it is screwed into the base element 14 during transport.

Figure 4A:
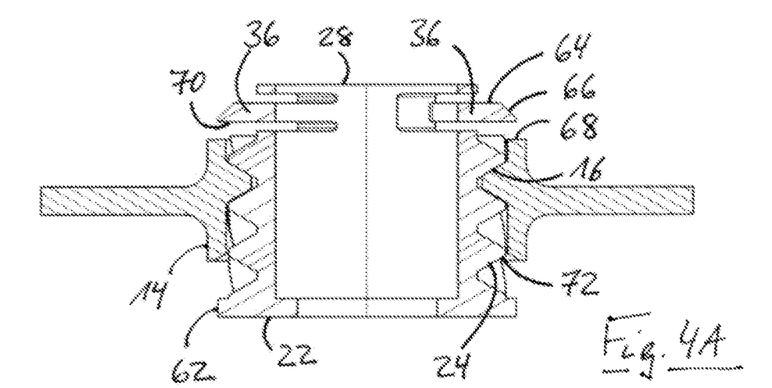
FIG. 4A is a sectional view of a fourth embodiment of a tolerance compensation device according to the present disclosure.
Figure 4B:
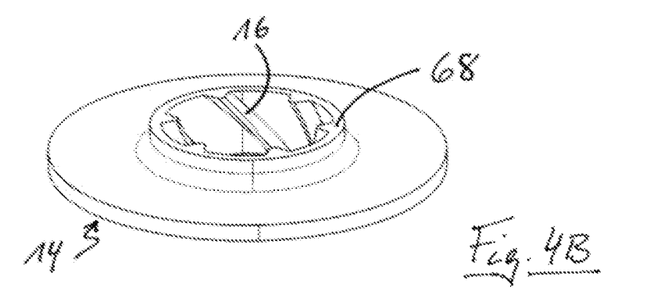
FIG. 4B shows a base element of the tolerance compensation device of FIG. 4A.
Figure 4C:
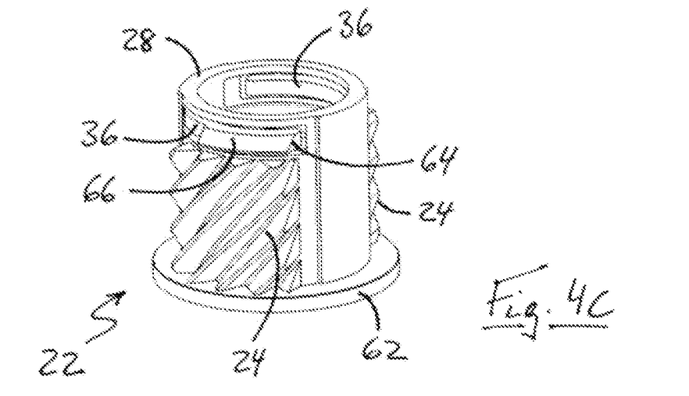
FIG. 4C shows a compensating element of the tolerance compensation device of FIG. 4A.

A fourth embodiment of a tolerance compensation device is shown in FIG. 4A to 4C. This also comprises a base element 14 which is integrated into a first component 10 (not shown here) and has a hollow-cylindrical basic shape and forms an internal thread 16, here a right-hand thread, whose longitudinal central axis defines an axial direction.

Furthermore, the tolerance compensation device according to the fourth embodiment also comprises a compensating element 22 which, like the compensating element 22 of the first embodiment, has a hollow-cylindrical basic shape and has an external thread 24 complementary to the internal thread 16 of the base element 14. Furthermore, in the present case, a spring clip 38 (not shown) can also be arranged inside the compensating element 22 in order to optimize the transmission of torque from a connecting element inserted through the tolerance compensation device to the compensating element 22.

In contrast to the first embodiment, the compensating element 22 of the fourth embodiment is screwed into the first component 10 from a side facing away from the second component, i.e. from below in FIG. 4A. Consequently, the compensating element 22 has no collar 26 on its upper face facing the second component. Rather, the contact surface 28 that comes into contact with the second component is formed by the annular face of the hollow-cylindrical base body of the compensating element 22.

Instead, a radially projecting circumferential collar 62 is formed on the opposite, lower face of the compensating element 22, i.e. the face facing away from the second component. This collar 62 serves to limit the screwing-in movement of the compensating element 22, from below in FIG. 4A, into the base element 14 and thus also the unscrewing movement of the compensating element 22 in the direction of the second component, i.e. upwards out of the base element 14 in FIG. 4A.

The compensating element 22 is also provided with at least one elastically deformable transport securing tongue 36 for securing the compensating element 22 screwed into the base element 14 against unintentional unscrewing, for example during transport. In the embodiment shown, the compensating element 22 has two transport securing tongues 36 which, seen in the circumferential direction, are arranged offset from one another by 180°.

The transport securing tongues 36 emerge in the circumferential direction from the hollow-cylindrical base body of the compensating element 22 and each form a projection 64 which, when the transport securing tongue 36 is in a rest position, protrudes radially outwards beyond the external thread 24 and has an inclined surface 66 on its upper side facing the second component. If the compensating element 22 is screwed into the base element 14, from below in FIG. 4A, the internal thread 16 of the base element 14 runs onto the inclined surfaces 66 and the transport securing tongues 36 are pressed radially inwards against their spring force, i.e. they deviate inwards to allow the compensating element 22 to enter the base element 14.

As soon as the compensating element 22 has been screwed into the base element 14 until the upper face of the compensating element 22 protrudes from the top of the base element 14 and the transport securing tongues 36 and the internal thread 16 of the base element 14 are disengaged, the transport securing tongues 36 jump back radially outwards into their rest position, in which the projections 64 protrude radially beyond the external thread 24 of the compensating element 22 and thus at least partially also the upper face 68 of the base element 14. Since both the upper face 68 of the base element 14 and the undersides 70 of the projections 64 facing the upper face of the base element 14 are substantially planar and run at right angles to the longitudinal central axis, the transport securing tongues 36 secure the compensating element 22 against unintentional unscrewing downwards from the base element 14 as soon as they abut the upper end face 68 of the base element 14. In this case, the upper face 68 of the base element 14 forms a first stop for the transport securing tongues 36.

In addition, the base element 14 also forms a second stop for the transport securing tongues 36, namely in the region of a lower face of the base element 14. This second stop is formed by a radially inwardly directed projection 72, which runs onto the inclined surfaces 66 of the transport securing tongues 36 in order to press them radially inwards, and which the transport securing tongues 36 grip from behind as soon as they have overcome the projection 72 when screwing the compensating element 22 from below into the base element 14 in the axial direction. A compensating element 22 that is only partially screwed into the base element 14 is thus already secured against unintentional unscrewing, downwards in FIG. 4A, by the projection 72.

LIST OF REFERENCE NUMBERS

10 First component
14 Base element
16 Internal thread
18 Lateral surface
20 Rib
21 Upper side
22 Compensating element
24 External thread
26 Collar
28 Contact surface
30 Plastic ring
32 Outer wall
34 Knurling
36 Transport securing tongue
36a First tongue portion
36b Second tongue portion
37 Lower edge
38 Spring clip
40 Base body
41 Base
42 Threaded bore
44 Flange portion
46 Groove
48 Web
52 Wall portion
53 Ramp
54 Planar surface
55 Stop tongue
56a First threaded portion
56b Second threaded portion
58 Central collar
60a First external thread
60b Second external thread
62 Collar
64 Projection
66 Inclined surface
68 Upper face
70 Underside
72 Projection

We claim:
1. A tolerance compensation device for bridging a distance between two components to be connected to one another, the tolerance compensation device comprising:
a base element including at least one stop; and
a compensating element configured to be screwed into the base element, the compensating element including:
a radially projecting collar;
a plastic ring attached to the collar in a rotationally fixed manner, the plastic ring including at least one elastically deformable transport securing means, the transport securing means comprising a spring tongue that projects axially at least in part from the collar of the compensating element in the direction of the base element,
wherein the spring tongue is configured to temporarily deform to overcome the at least one stop, allowing the compensating element to be screwed into the base element.

2. The tolerance compensation device according to claim 1, wherein the compensating element has at least one end stop which can be engaged with the at least one stop of the base element to limit the screwing movement of the compensating element into the base element.

3. The tolerance compensation device according to claim 1, wherein the plastic ring includes at least one end stop of the compensating element.

4. The tolerance compensation device according to claim 1, wherein the plastic ring includes a lateral surface with a structure that increases grip.

5. The tolerance compensation device according to claim 4, wherein the structure that increases grip comprises one of a knurled surface and a plurality of planar surfaces.

6. The tolerance compensation device according to claim 1, wherein the at least one stop of the base element is defined by a radially projecting rib, by a web or wall portion which delimits a pocket or groove formed in a surface of the base element facing the compensating element, by an end face of the base element and/or by a radially inwardly directed projection of the base element.

7. The tolerance compensation device according to claim 1, wherein the base element includes a first stop for interaction with the transport securing means and a second stop for interaction with an end stop of the compensating element.

8. The tolerance compensation device according to claim 1, wherein the base element is an integral part of one of the two components.

9. A tolerance compensation device for bridging a distance between two components to be connected to one another, the tolerance compensation device comprising:
a base element including at least one stop; and
a compensating element configured to be screwed into the base element, wherein:
the compensating element includes at least one elastically deformable transport securing means,
the transport securing means comprises a spring tongue extending in the circumferential direction,
the spring tongue forms a radially outwardly directed projection that extends beyond an external thread of the compensating element, and
the spring tongue is configured to temporarily deform to overcome the at least one stop, allowing the compensating element to be screwed into the base element.

10. The tolerance compensation device according to claim 9, wherein the at least one stop of the base element is defined by an end face of the base element and/or by a radially inwardly directed projection of the base element.

11. The tolerance compensation device according to claim 9, wherein the base element includes a first stop for interaction with the transport securing means and a second stop for interaction with an end stop of the compensating element.

12. The tolerance compensation device according to claim 9, wherein the base element is an integral part of one of the two components.

13. A compensating element for a tolerance compensation device having a base element, the compensating element comprising:
- at least one elastically deformable transport securing means, wherein:
- the transport securing means comprises a spring tongue extending in the circumferential direction,
- the spring tongue forms a radially outwardly directed projection that extends beyond an external thread of the compensating element, and
- the spring tongue is configured to temporarily deform to overcome a stop of the base element, allowing the compensating element to be screwed into the base element.

* * * * *